United States Patent Office 3,714,235
Patented Jan. 30, 1973

3,714,235
METHOD OF PRODUCING D- OR DL-17a-ALPHA-ACETATE OF 3-METHYL ETHER OF D-HOMO-ESTRADIOL
Ardalion Vladimirovich Zakharychev, Tatyana Andreevna Serebryakova, Sofia Nikolaevna Ananchenko, and Igor Vladimirovich Torgov, Moscow, U.S.S.R., assignors to Institut Khimii Prirodnykh Soedineny Im. M.M. Shemyakina Akademii Nauk SSSR, Moscow, U.S.S.R.
No Drawing. Filed June 14, 1971, Ser. No. 152,982
Claims priority, application U.S.S.R., June 12, 1970, 1,437,779
Int. Cl. C07c 67/00
U.S. Cl. 260—491
3 Claims

ABSTRACT OF THE DISCLOSURE

A method of producing D- or D,L-17a-acetate of the 3-methyl ether of D-homoestradiol in which 3-methoxy-$\Delta^{1,3,5(10),8(9),14(15)}$-D-homoestrapentaen-17a-$\beta$-ol acetate is reduced by a mixture of trifluoroacetic acid and triethylsilane in the medium of an inert organic solvent, whereupon the final product is isolated. The herein-proposed invention finds application in the synthesis of D-or D,L-19-nor-D-homotestosterone which is a highly active anabolic agent featuring low androgenic activity and is employed as a growth stimulant in farm animals.

The present invention is concerned with a method of producing D- or D,L-17a-acetate of the 3-methyl ether of D-homoestradiol which is applicable as an original stock in the process of synthesis of D- or D,L-19-nor-D-homotestosterone. 19-nor-D-homotestosterone is a highly active anabolic agent featuring low adrogenic activity, and is employed as a growth stimulant in farm animals.

Known in the present state of the art is a method of producing the 3-methyl ether of D-homoestradiol.

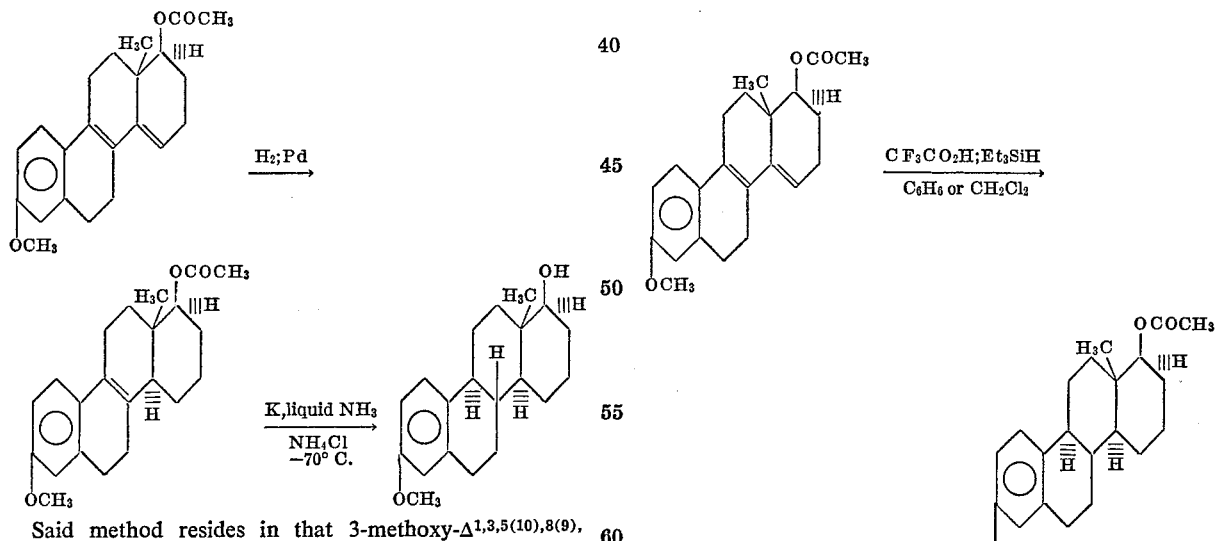

Said method resides in that 3-methoxy-$\Delta^{1,3,5(10),8(9),14(15)}$-D-homoestrapentaen-17a-$\beta$-ol acetate is hydrogenated in a solution of tetrahydrofuran with gaseous hydrogen at an atmospheric pressure over 10-percent palladium catalyst on calcium carbonate as a carrier.

Upon filtering out the catalyst, evaporating the solvent and crystallizing the residue there is obtained 3-methoxy-$\Delta^{1,3,5(10),8(9)}$-D-homoestratetraen-17a-$\beta$-ol acetate.

The thus-obtained product is dissolved in a mixture of tetrahydrofuran and ether, the solution is added dropwise to liquid ammonia and metallic potassium is introduced thereinto at —70° C. Then the mixture is allowed to stand for 1 hour, whereupon ammonium chloride is added thereto, ammonia is evaporated, the residue is extracted with ether, and the extract is neutralized with carbon dioxide, washed with water, dried and the solvent is evaporated. The resultant residue is crystallized from methanol to obtain the 3-methyl ether of D-homoestradiol (cf. Chemico-pharmaceutical journal, (II), 1971; Patent of GFR No. 242777).

A disadvantage inherent in the aforesaid method is the complicated process technology which requires a two-stage reduction process in which the first stage involves the use of a palladium catalyst and explosive hydrogen, while the second stage involves complicated apparatus and equipment since it provides for the process to be run at low temperatures (—60 to —70° C.) and the use of high-purity ammonia and highly inflammable metallic potassium.

It is a general object of the present invention to simplify the technological operations of the process.

Said object has been accomplished by the present invention in which a method of producing D- or D,L-17a-acetate of the 3-methyl ether of D-homoestradiol by way of reduction of 3 - methoxy - $\Delta^{1,3,5(10),8(9),14(15)}$-D-homoestrapentaen-17a-$\beta$-ol acetate followed by the isolation of the final product, according to the invention the process of reducing 3 - methoxy - $\Delta^{1,3,5(10),8(9),14(15)}$-D-homoestrapentaen-17a-$\beta$-ol acetate is carried out by means of a mixture of trifluoroacetic acid with triethylsilane in the medium of an inert organic solvent followed by the isolation of the final product.

It is preferred that 3-methoxy-$\Delta^{1,3,5(10),8(9),14(15)}$-D-homoestrapentaen-17a-$\beta$-ol acetate, trifluoroacetic acid and triethylsilane be used in a molar ratio of 1:20:20, respectively.

It is preferable to use methylene chloride or benzene as an inert organic solvent.

The herein-proposed method is carried into effect as follows:

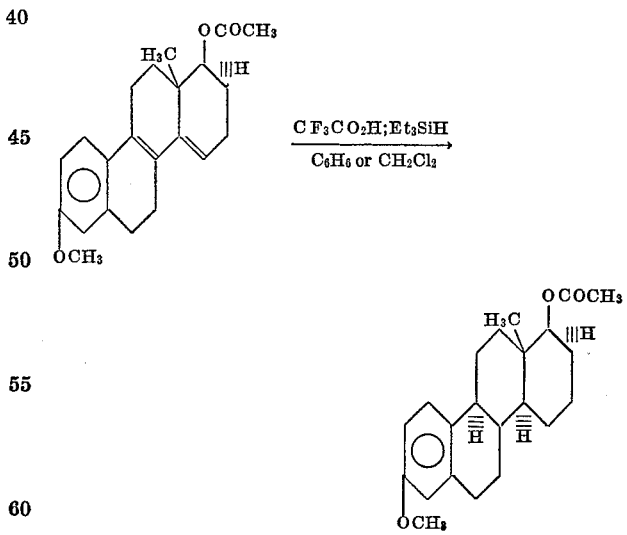

To a solution (preferably in benzene or methylene chloride) of acetate of the 3-methyl ether of $\Delta^{1,3,5(10),8(9),14(15)}$-D-homostrapentaen-17a-$\beta$-ol are added triethylsilane and trifluoroacetic acid taken at a molar ratio of 1:20:20 respectively. The mixture is maintained at 20° C. for 24 hours, after which it is poured into a 10-percent aqueous solution of sodium bicarbonate with ice and extracted with ether. The extract is washed with water, dried and the solvent is evaporated. The residue is crystallized from a methanol-ethylacetate mixture to obtain 17a-acetate of 3-methyl ether of D-homoestradiol.

The yield of the final product is 25–30 wt. percent.

The proposed method makes it possible to simplify the technological operations involved in the process.

The reduction of $\Delta^{14(15)}$- and $\Delta^{8(9)}$-double bonds in the starting pentaenol is carried out in a single stage.

The stage of hydrogenation of $\Delta^{14(15)}$-double bond in the starting pentaenol that involves the use of a palladium catalyst and explosive hydrogen, is dispensed with along with the stage of reducing $\Delta^{8(9)}$-double bond which requires refrigerating apparatus for the reaction temperature to maintain it at −60 to −70° C., as well as the use of highly inflammable metallic potassium.

In order that the invention will be better understood given below are a number of exemplary embodiments of the method of producing D- or D,L-17a-acetate of the 3-methyl ether of D-homoestradiol.

EXAMPLE 1

To a solution of 900 mg. acetate of the 3-methyl ether of $\Delta^{1,3,5(10),8(9),14(15)}$-D-homoestrapentaen-17a-$\beta$-ol in 18 ml. benzene are added 9 ml. triethylsilane and 5.2 ml. trifluoroacetic acid. The mixture is maintained at 20° C. for 24 hours, then it is poured into a 10-percent aqueous solution of sodium bicarbonate with ice and extracted with ether. The extract is washed with water, dried with anhydrous magnesium sulphate and the solvent is evaporated. Upon crystallizing the residue from a methanol-ethylacetate mixture (2:1) there is isolated 220 mg. (24 wt. percent of theoretical yield) 17a-acetate of the 3-methyl ether of D-homostradiol having a boiling point of 156–159° C. and identical to a specimen obtained by an independent method.

EXAMPLE 2

To a solution of 100 mg. acetate of the 3-methyl ether of $\Delta^{1,3,5(10),8(9),14(15)}$-D-homoestrapentaen-17a-$\beta$-ol in 1 ml. methylene chloride are added 1 ml. triethylsilane, 0.5 ml. trifluoroacetic acid and the mixture is maintained at 20° C. for 24 hours. Then the mixture is poured into a 10-percent aqueous solution of sodium bicarbonate with ice and extracted with ether. The extract is washed with water, dried with anhydrous magnesium sulphate and the solvent is evaporated. Upon crystallizing from a methanol-ethylacetate mixture (2:1) there is isolated 30 mg. 17a-acetate of 3-methyl ether of D-homoestradiol having a boiling point of 155–159° C. and similar to a specimen obtained by an independent method.

What we claim is:

1. A method of producing D- or D,L-17a-acetate of the 3-methyl ether of D-homoestradiol, which comprises reducing 3 - methoxy-$\Delta^{1,3,5(10),8(9),14(15)}$-D-homoestrapentaen-17a-$\beta$-ol acetate with a mixture of trifluoroacetic acid and triethylsilane in the medium of an inert organic solvent, and isolating the final product.

2. A method as claimed in claim 1, wherein 3-methoxy-$\Delta^{1,3,5(10),8(9),14(15)}$ - D-homoestrapentaen-17a-$\beta$-ol acetate, trifluoroacetic acid and triethylsilane are used in a molar ratio of 1:20:20.

3. A method as claimed in claim 1, wherein the inert organic solvent is selected from the group consisting of methylene chloride and benzene.

References Cited

UNITED STATES PATENTS

| | | | |
|---|---|---|---|
| 3,394,151 | 7/1968 | Hoffsommer, Jr., et al. | 260—488 CD |
| 3,491,130 | 1/1970 | Buzby | 260—488 CD |
| 3,586,710 | 6/1971 | Los | 260—488 CD |
| 3,646,114 | 2/1972 | Pitt | 260—488 CD |

VIVIAN GARNER, Primary Examiner

U.S. Cl. X.R.

260—586 H, 613 R